United States Patent

[11] 3,586,209

| [72] | Inventor | John A. Keller<br>Bucyrus, Ohio |
|---|---|---|
| [21] | Appl. No. | 856,075 |
| [22] | Filed | Sept. 8, 1969 |
| [45] | Patented | June 22, 1971 |
| [73] | Assignee | Shunk Manufacturing Co., Inc.<br>Bucyrus, Ohio |

[54] TAILGATE SPREADER WITH HOPPER BYPASS COVER
13 Claims, 11 Drawing Figs.

| [52] | U.S. Cl. | 222/178 |
|---|---|---|
| [51] | Int. Cl. | A01c 15/00 |
| [50] | Field of Search | 222/176, 178; 298/1, 7 |

[56] References Cited
UNITED STATES PATENTS

| 2,872,080 | 2/1959 | Thene | 222/178 |
|---|---|---|---|
| 3,249,264 | 5/1966 | Plesko et al. | 222/178 X |

*Primary Examiner*—Stanley H. Tollberg
*Attorney*—J. H. Slough

ABSTRACT: A dump truck is provided at its rearmost end with a laterally elongated hopper having a screw feed conveyor therein adapted to convey sand, salt, cinders or other granular material to an opening in the bottom of the hopper. A self-leveling, rotatable sand spreader is disposed beneath the opening in the hopper, the location of the said opening being controlled by a hydraulically actuated discharge plate. A hinged cleanout gate is provided at the rear of the hopper, and a dump gate, foldable downwardly over the top of the hopper, is provided for allowing the granular material to pass over the spreading mechanism and be dumped directly from the truck.

PATENTED JUN22 1971

INVENTOR.
John A. Keller
BY
J.H. SLOUGH
ATTORNEY

TAILGATE SPREADER WITH HOPPER BYPASS COVER

This invention pertains to spreading mechanisms for spreading sand, salt, cinders or similar granular material on roads and highways. The invention particularly relates to a tailgate spreader for mounting to the rearward end of dump truck. Spreader means of this general type are known wherein a hopper is provided at the rearmost end of a dump truck, said hopper having means therein for conveying the material to an opening where it is dropped onto a rotating spreader. One such device is shown in U.S. Letter Pat. No. 3,189,355 to E. W. Swenson et al., issued June 15, 1965.

The present invention provides several improvements over such known types of spreading mechanisms. As hereinlater fully disclosed, the present spreader is provided with a hopper, the rear edge of which is provided with a nondetachable dump gate pivotable between a position overlying, and closing the top of the hopper and a generally upright position whereby material from the dump body is guided into the hopper to be discharged through an opening in the bottom thereof onto a material spreading spinner. In the first-mentioned position, material can be dumped directly from the dump box over the closed hopper without removing the spreader from the back of the truck. The improved arrangement obviates the necessity of manually removing the dump gate from the truck to change its position for dumping or spreading operations.

Another improvement of the present invention comprises a cleanout gate which constitutes the rear wall of the hopper and pivots upwardly to expose the entire conveyor mechanism and provide access to the same for unjamming the material, cleaning and repairing the conveyor, etc.

Both the dump gate and the cleanout gate are conveniently and compactly hinged to a single hinge bar for simple and easy manipulation.

Further improvement over the prior constructions is provided in the form of the slidable discharge plate having an orifice therein smaller than the opening in the bottom of the hopper, the discharge plate being slidably mounted across the hopper opening. Power means connected to a control means in the cab of the truck enables the driver to remotely shift the position of the discharge plate thereby changing the position of the discharge orifice with respect to the spinner to control material spread. This has been found to provide substantially improved and simplified control over the pattern of material spread as compared to known devices in which the spinner is shifted or tilted to vary said pattern.

It is therefore, an object of this invention to provide an improved tailgate spreader construction wherein the dump truck to which it is attached can be readily used for ordinary dumping operations without removing the spreader mechanism therefrom.

A further object of the invention is to provide improved means for controlling the pattern of spread of the material being dispersed.

Still another object of the invention is to provide improved spreader controlling means which can be readily operated by a simple control in the cab of the truck.

A still further object of the invention is to provide such a construction wherein the feeding mechanism thereof is readily accessible for purposes of cleaning, repair, and the like.

A still further object of the invention is to provide means permanently affixed to the spreader mechanism optionally covering and closing the hopper or serving to guide the material into the hopper.

Other objects of the invention and a number of the advantages thereof will be evident from the following detailed description of the invention and the accompanying drawings, in which said drawings.

Figure 1:
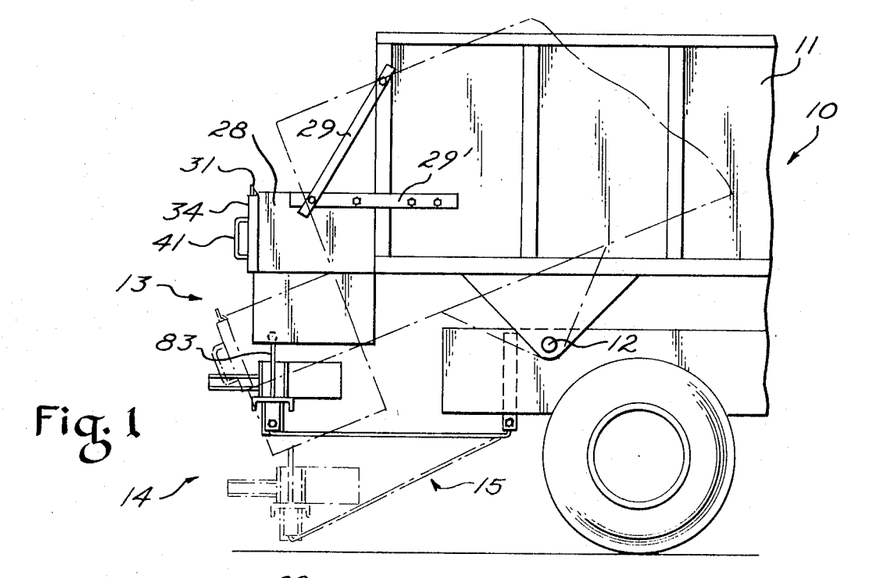
FIG. 1 is a side elevation of the read end portion of a dump truck having the tailgate spreader of this invention mounted thereto, the same being shown in two different positions by full and broken lines.

Referring now to the drawings in all of which like parts are designated by like reference numerals, the present invention is shown mounted on a conventional dump truck generally indicated at 10 having the dump body 11 tiltable rearwardly about a transverse axis 12, the same being shown by the contrasting full and broken line showings of FIG. 1. The mechanism for tilting the dump box 11 (not herein illustrated) may be of any suitable type well known to those familiar with the art.

The tailgate spreader is fixedly mounted to the rearmost end of the dump box 11 and, in general, comprises a hopper 13, a rotatable spreader 14 disposed beneath the hopper 13, and a leveling brace 15 pivotally connecting the spreader to the frame of the truck 10.

Figure 3:
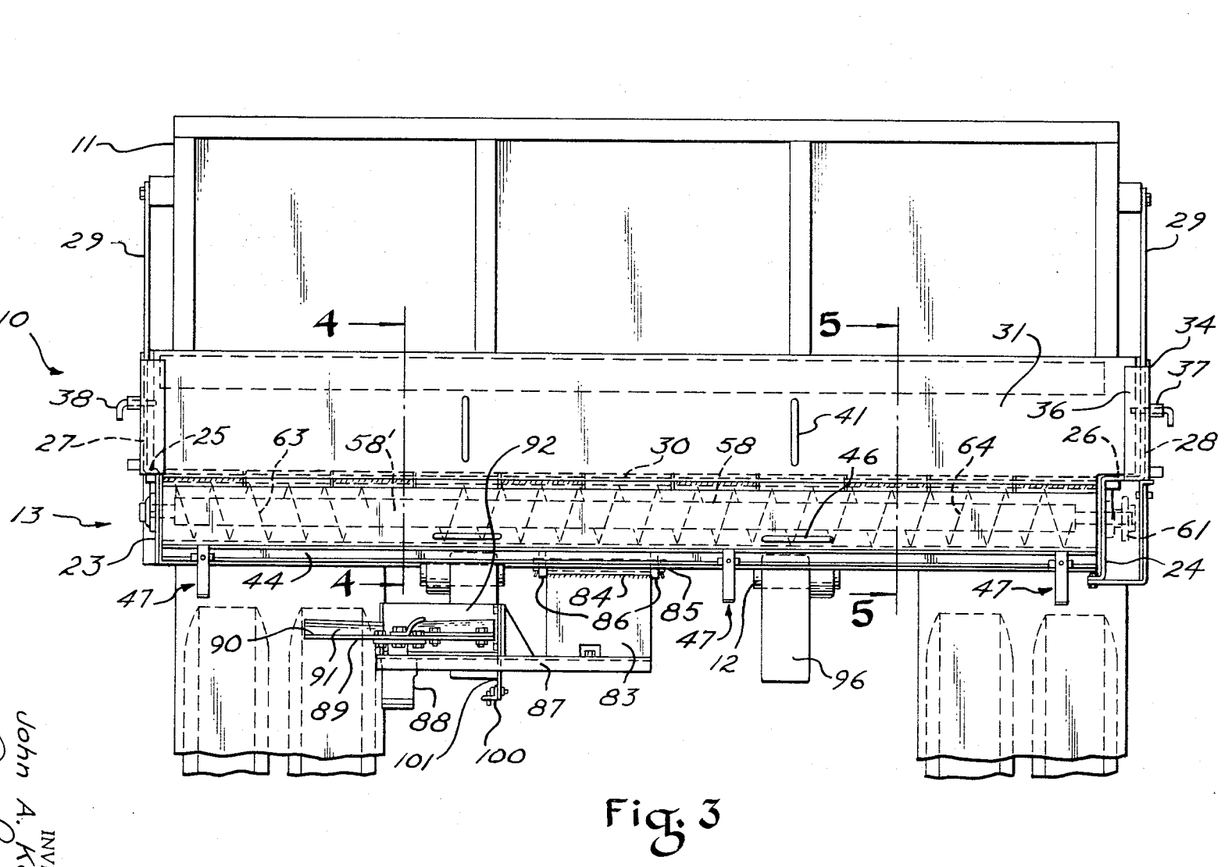
FIG. 3 is a rear elevation of the tailgate spreader and truck drawn to the scale of FIG. 1.
Figure 4:
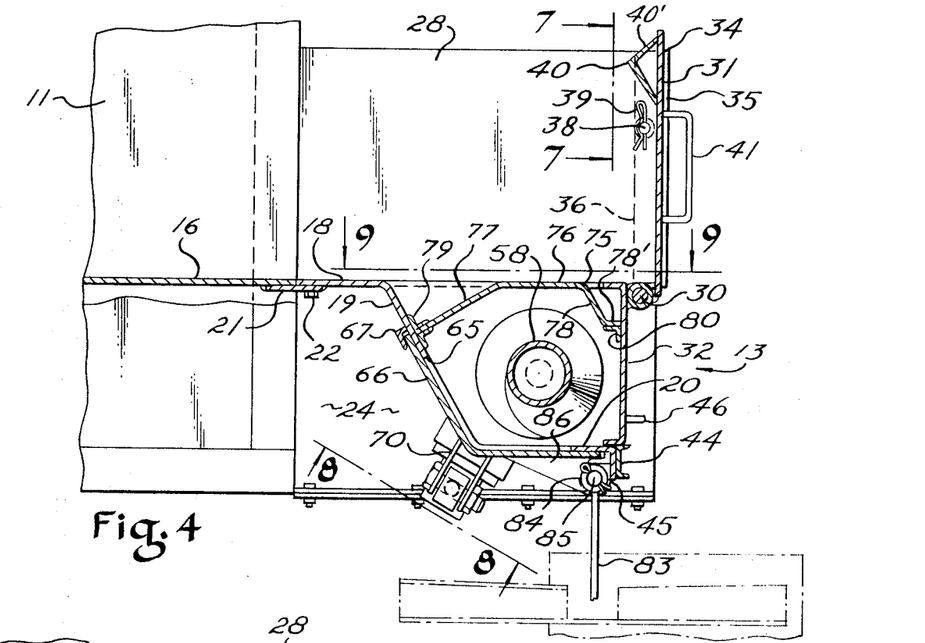
FIG. 4 is an enlarged vertical section taken along the line 4—4 of FIG. 3.
Figure 5:
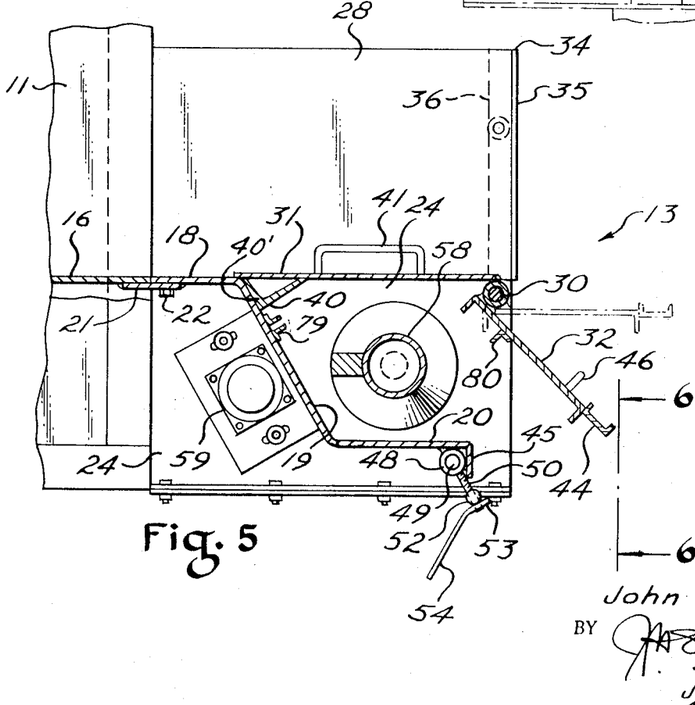
FIG. 5 is an enlarged vertical section taken along the line 5—5 of FIG. 3 showing portions of the spreader in different positions from those shown in FIG. 4.

As best seen in FIGS. 4 and 5, the hopper 13 comprises a forwardly directed, horizontal wall portion 18, a rearwardly and downwardly angled wall portion 19, and a rearwardly extending horizontal bottom wall 20 extending rearwardly from the lower edge of the angled wall portion 19. The upper horizontal wall portion 18 is preferably disposed at the level of a floor 16 of the dump box 11 and constitutes a rearward continuation of said floor whereby sand, salt, cinders, or other granulated material can move smoothly from the dump box into the hopper. Mounting means for connecting the hopper to the dump box 11 are shown in the form of metal straps or connectors 21 welded or otherwise suitably secured to the floor 16 at one end and secured to the horizontal wall portion 18 by any suitable means such as bolts 22. As best seen in FIG. 3, the laterally directed ends of the hopper 13 are closed by vertical end plates 23 and 24 which are laterally outwardly stepped at the level of the horizontal wall portion 18, as indicated at 25 and 26, respectively. End walls 27 and 28, extend upwardly from the steps 25 and 26, respectively, and form, in effect, rearward extensions of the dump box 11. Additional braces 29 and 29' are connected to the end walls 27, 28 and the dump box 11 to further secure the tailgate spreader to said dump box.

Figure 7:
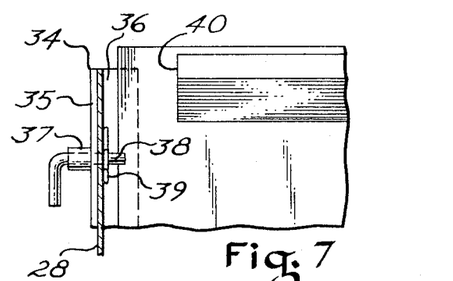
FIG. 7 is a detailed elevation as seen from the line 7—7 of FIG. 4.
Figure 10:
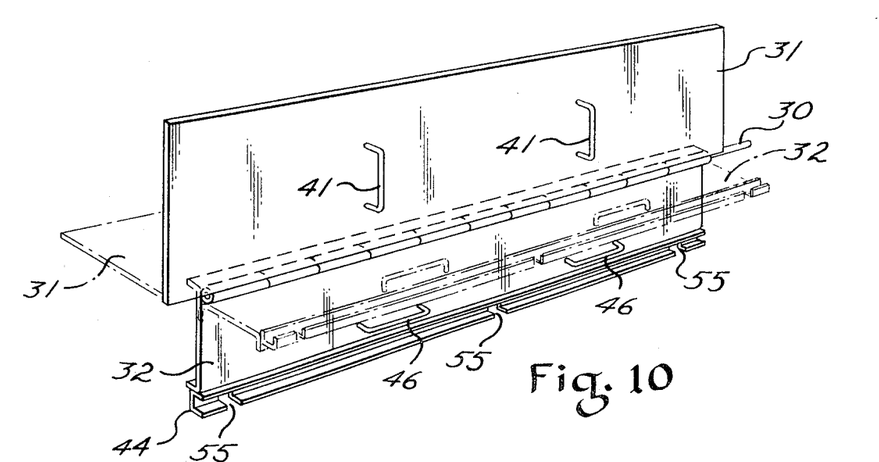
FIG. 10 is a perspective view of dump and cleanout gates of the spreader, each gate being shown in two different positions by full and broken lines.

A hinge bar 30 extends transversely of the truck between the end plates 23 and 24, and as shown in FIG. 4 and 10, carries a pivoted dump gate 31 projecting upwardly therefrom and a pivoted cleanout gate 32 extending downwardly therefrom. As further detailed in FIG. 7, the end walls 27 and 28 are provided at their rearmost edges with vertical angle members 34 having one web 35 thereof secured flatwise against one of said end walls and the other web 36 thereof projecting inwardly behind a lateral edge portion of the dump gate 31. A transverse collar 37 is welded or otherwise suitably secured to the outer surface of the web 35 and is adapted to receive a heavy pin 38 which projects inwardly through said collar and through suitably aligned apertures in the web 35 and the adjacent end wall with the inner end portion of the pin 38 overlapping a lateral edge portion of the dump gate 31 to hold the same in the upright position. A suitable hairpin-shaped cotter pin 39 retains the pin 38 in position in a conventional manner.

The dump gate 31 is provided with a V-shaped strip 40 disposed adjacent to the distal edge of the said dump gate on the side thereof facing forwardly as shown in FIG. 4. As shown in FIG. 5, the apex of the strip 40 projects downwardly when the dump gate 31 is in the closed or downwardly pivoted position with one of its angled surfaces 40' lying generally flatwise against the angled wall portion 19 of the hopper 13. The V-shaped strip 40 strengthens and stiffens the distal edge of the dump gate 31 and assists in sealing the top of the hopper when the same is closed to allow material in the dump box 11 to be dumped rearwardly over the entire spreader mechanism. It will be readily understood that the dump gate 31 can be lowered from the position of FIG. 4 to that shown in FIG. 5 (and from the full line to the broken line position of FIG. 10) by removing the cotter pins 39, withdrawing the pins 38, and pivoting the gate forwardly. Handles 41 are provided on the rearward or outer surface of the dump gate 31 to facilitate lowering and raising the same.

The cleanout gate 32 is provided at its lower edge with a rearwardly opening channel member 44 welded or otherwise suitably secured thereto and adapted to abut a downturned flange 45 of the horizontal bottom wall portion 20. Handles 46 are provided on the outer surface of the cleanout gate 32 to facilitate opening and raising the same as shown in the full and dotted line positions of FIG. 5. Thus, complete access is afforded to the inside of the hopper for purposes of cleaning and repairing the same.

Figure 6:
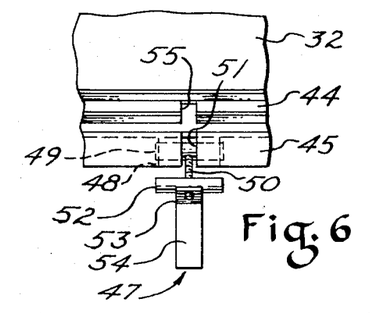
FIG. 6 is a detailed elevation as seen from the line 6—6 of FIG. 5.

Locking means, generally designated at 47 in FIG. 3, are provided for locking the cleanout gate 32 in its closed position. As herein illustrated, there are three such identical locking means disposed at spaced intervals along the lower edge of the hopper. Referring now to the details of FIGS. 5 and 6, each locking means comprises a transverse bearing means 48 welded or otherwise suitably secured in the angle provided by the bottom wall 20 and the downturned flange 45. Each bearing means 48 carries a journal 49 having an outwardly directed threaded stud 50. The bearing means 48 is provided in two sections disposed on either side of a slot 51 in the flange 45, best seen in FIG. 6. The slot 51 affords means for the stud 50 to be pivoted upwardly from the downwardly angled position illustrated in FIG. 5. The outer end portion of each said stud is provided with a transversely disposed locking bar 52, the stud 50 projecting slidably through a diametrically disposed opening in said locking bar. The extreme outer end portion of the stud 50 has a threaded adjustment member 53 comprising an angularly bent bar, a portion of said bar affording an outwardly projecting handle 54. For each slot 51 in the downturned flange 45 there is provided an aligned slot 55 in the channel member 44. When the cleanout gate 32 is pivoted downwardly to the closed position as shown in FIG. 4, the stud 50 is pivoted upwardly through the slots 51 and 55 to the position where the locking bar 52 is adapted to seat transversely within the open side of the channel member 44. By rotating the handle 54 of the adjustment member 53, the locking bar is then tightly seated within the channel member 44 whereby the cleanout gate 32 is rigidly locked in the closed position.

Figure 2:
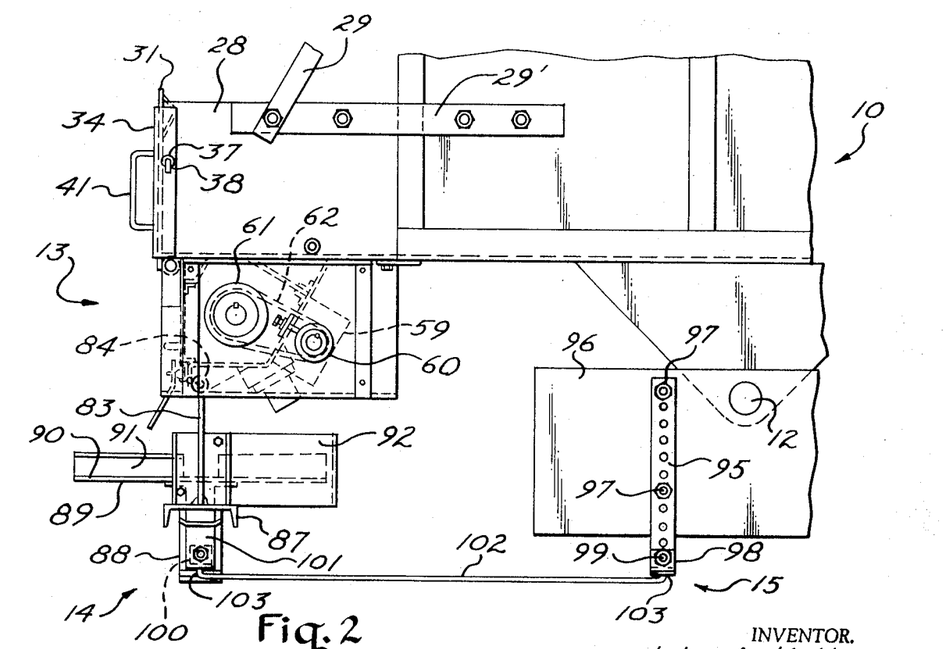
FIG. 2 is an enlarged view of the tailgate spreader of this invention as seen from the same direction as FIG. 1.

Referring now particularly to FIGS. 2—4, a transversely disposed screw conveyor 51 is disposed within the hopper 13 between the end plates 23 and 24 thereof. Suitable means are provided for rotating the screw conveyor 58, and as herein illustrated such means comprise a hydraulic motor 59 mounted on the outer or under surface of the angled wall portion 19 of the hopper 13. The motor 59 has a drive sprocket 60 connected through a chain 62 to a driven sprocket 61 carried by the end of the screw conveyor. The screw conveyor 58 has right- and left-hand screw flights 63 and 64, respectively, disposed on either side of a plain shaft portion 58' of said screw conveyor which is, in turn, disposed vertically over the rotary spreader 14.

Figure 8:
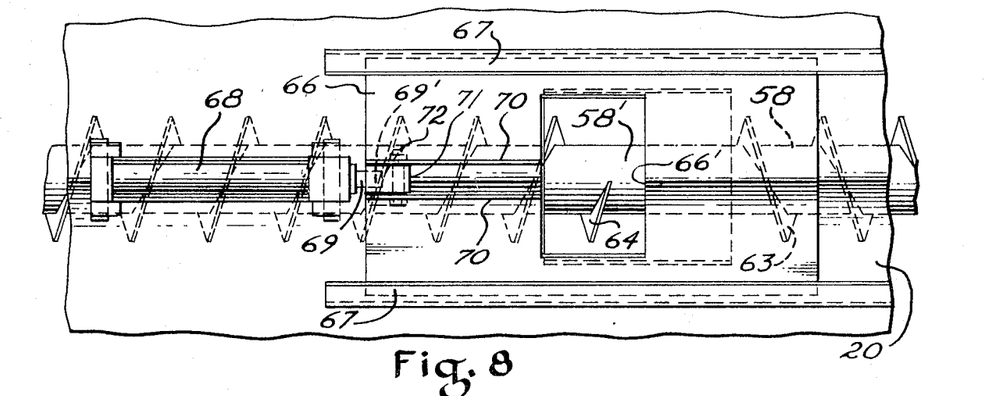
FIG. 8 is a fragmentary detail looking generally upwardly at the bottom of the hopper as viewed from the line 8—8 of FIG. 4.
Figure 11:
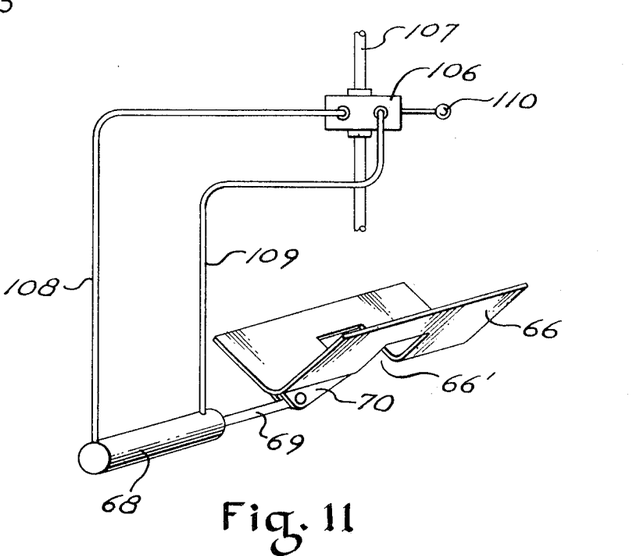
FIG. 11 is a perspective view of the hopper discharge plate and power means for actuating the same, certain control means therefor being shown schematically.

As shown in FIG. 4, an opening is provided in the bottom of the hopper 13 which extends into both the angled wall portion 19 and the bottom wall 20 above the forward portion of the spreader 14. An angle-shaped discharge plate 66, also shown in FIGS. 8 and 11, is disposed against the bottom surfaces of the angled wall portion 19 and the bottom wall 20 and is mounted for sliding movement lengthwise of the hopper 13; that is, transversely with respect to the truck 10. Said discharge plate is mounted for movement across the opening 65 by means of angle-shaped guides 67 engaging the edges of said plate. Sliding movement of the discharge plate 66 is effected by a cylinder and piston motor 68 mounted on the bottom of the hopper having the outer end of its piston rod 69 secured to the closure member 66. As herein illustrated, said discharge plate is provided with a pair of spaced webs 70 which project from the generally lower surface portions thereof and provide means for receiving therebetween an apertured block 71 (see FIG. 8). The block 71 is mounted between the spaced webs 70 by means of a nut and bolt assembly 72. A threaded end portion 69' of the piston rod 69 is thread fitted into one end of said block to complete the connection between the discharge plate 66 and the cylinder and piston motor 68.

The discharge plate 66 is provided with a discharge orifice 66' which extends longitudinally of the hopper 13 a shorter distance than the corresponding dimensions of the opening 65 in the bottom of said hopper. The discharge plate 66 as a whole always covers the opening 65 with the exception of the orifice 66' which remains generally aligned with said opening. By means of the cylinder and piston motor 68, the discharge plate 66 is shiftable longitudinally of the hopper 13 (laterally with respect to the dump truck 10) whereby the discharge orifice 66' is shifted from one end to the other of the opening 65. This causes the granular material to strike the spreader 14 at varying positions to vary the pattern of spread, as will hereinlater be fully described.

Figure 9:
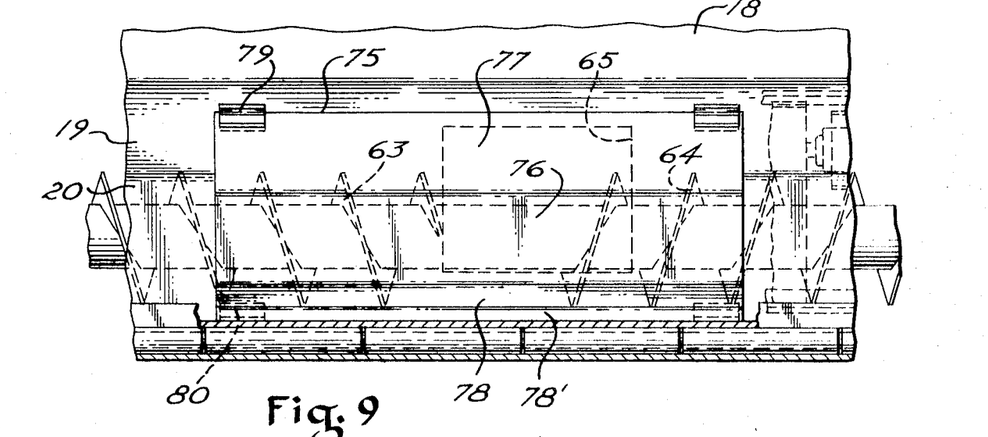
FIG. 9 is a horizontal section looking downwardly into the hopper generally taken along the line 9—9 of FIG. 4.

As best seen in FIG. 4 and 9, the plain shaft portion 58' and the opening 65 are covered by a protective cover or baffle 75 whereby the material from the dump box 11 cannot fall directly down past the screw conveyor and through said opening. The cover or baffle 75 extends laterally in overlapping relationship with the screw flights 63 and 64 a substantial distance and comprises an upper horizontal portion 76, a forwardly and downwardly angled portion 77, and a rearwardly and downwardly angled portion 78 having a rearwardly directed, horizontal flange 78'. Pairs of spaced angle members 79 carried by the inner surface of the angled wall portion 19 provide slots for receiving edge portions of the forwardly and downwardly angled portion 77 of said baffle. The inner wall of the cleanout gate 32 is provided with angle-shaped supports 80 upon which the flange 78' rests for support of the rear edge of the baffle 75. The baffle is easily removed at any time by opening the cleanout gate 32 and sliding said baffle out of the slots formed by the spaced angle members 79.

In operation, the granulated material to be spread necessarily drops down into the bottom of the hopper on either side of the baffle whereby it is conveyed in a controlled manner beneath the baffle and toward the opening 65.

The spreader 14 comprises a hanger plate 83 disposed transversely of the truck 10 and having a tubular bearing 84 welded to the upper edge thereof. A rod 85 projects through and extends beyond the end of the tubular bearing 84 where it is journaled in a pair of bearings 86 carried on the bottom of the bottom wall 20 of the hopper 13. The lower edge of the hanger plate 83 carries a transversely disposed, downwardly open channel shape support 87 which projects laterally as shown in FIG. 3 and supports a downwardly projecting hydraulic motor 88 for driving an upwardly directed spinner 89. The spinner 89 comprises a flat disc 90 having radially disposed, upwardly curved blades 91 adapted to receive and spread the granular material which drops through the discharge opening 65. As shown in FIG. 3 the spinner 89 is disposed laterally of the centerline of the truck adjacent to one side thereof, said spinner being provided with an arcuate baffle 92 which is disposed generally inwardly and forwardly of the spinner to confine the spread of the material to a pattern extending laterally outwardly and backwardly with respect to the dump truck 10.

Referring now particularly to FIGS. 1—3, the leveling brace 15 comprises a hanger link 95 secured to a truck frame member 96, and the lower end thereof is provided with an angled pivot member 98 pivoted thereto by nut and bolt assembly 99. A similarly angled pivot member 100 is pivoted to a vertically downwardly extending arm 101 projecting downwardly from the horizontal support 87 for the spinner 89. The angled pivot members 98 and 100 are connected to each other by an elongated rod 102 having upturned end portions 103 suitably secured to the pivot members 98 and 100. This arrangement serves to maintain the spinner 89 in a generally horizontal position even when the dump box 11 is tilted backwardly as illustrated in the broken line showing of FIG. 1. When feeding of the granular material to the hopper 13 requires tilting of the dump box, both said hopper and the spinner 98 are lowered but said spinner remains generally horizontal with respect to the roadway.

The hydraulic motors 59 and 88 which drive the screw conveyor 58 and spinner 89 respectively, may be connected in a conventional manner to the hydraulic system of the truck powered either by the truck motor or an auxiliary motor mounted thereto, with suitable control means being provided in the cab of the truck (not herein illustrated). Referring now particularly to FIG. 11, the cylinder and piston motor 68 for actuating the discharge plate 66 is connected to a three-way valve 106 which is interposed in a bypass line 107 of the truck hydraulic system and located in the cab of the truck. Lines 108 and 109 connect to the rear and front ends, respectively, of the motor 68 to the valve 106. Said valve is provided with an actuator handle 110 which is normally biased toward a neutral position and which is movable in opposite directions to direct pressure fluid through either line 108 or 109. In the neutral position of the handle 110, the fluid circulates across the valve 106 and the discharge plate 66 remains stationary; when said handle is moved in either direction, fluid passes through one of the lines 108 or 109 to move the discharge plate and, therefore, the orifice 66' with respect to the opening 65 in the bottom of the hopper 13.

Actuation of the discharge plate 66 causes the discharge orifice 66' to move either to the right or left as viewed from the rear end of the truck, shown in FIG. 3. If said orifice is moved toward the right, the pattern of spread of the granular material is toward the left; if said orifice is moved toward the left, the pattern is toward the rear of the truck. Intermediate patterns spreading both laterally and rearwardly may be effected by placing the orifice 66' in intermediate positions between the ends of the opening 65. The driver of the truck can readily control and manipulate the spread pattern by means of the valve 106 while the truck is in actual operation.

The upwardly projecting dump plate 31, when in the position shown in FIGS. 4 and 10, serves as a backplate for the dump truck thereby preventing spilling of the material outwardly over the spreader. One of the advantages of the present construction is that the dump truck 10 can be readily used for ordinary dumping operations by simply pivoting the dump gate 31 downwardly to the position of FIG. 5 (the broken line position of FIG. 10). Since said dump gate is hinged to the rearward portion of the spreader, its ready availability and simple manipulation greatly improves the usefulness of the vehicle. The structure is also simplified and improved by using a common axis, the hinge bar 30, to carry both the dump gate 31 and the cleanout gate 32. Such cleanout gate makes the entire screw conveyor available for inspection and cleaning by simply unlocking and raising said gate.

I Claim:

1. In a tailgate spreader for mounting on the discharge end of a load box of a truck for spreading granular material, a hopper having front, bottom, and end walls; means providing an opening in the bottom of said hopper; material dispersing means disposed beneath said opening; a hinge bar mounted between said end walls at the rear edge of said hopper; said bar pivotally carrying a first gate pivotal between an upright position for guiding material into the hopper and a lowered position for covering the top of the hopper whereby material can pass over said hopper; said bar pivotally carrying a second gate pivotal between a depending position closing the rear of said hopper and a rearwardly outwardly projecting position affording access to the interior of said hopper.

2. In a tailgate spreader as set forth in claim 1: an elongated stiffener member secured adjacent to the distal edge of said first gate on the surface thereof which faces said hopper in said lowered position; said front wall of said hopper being angled rearwardly toward the bottom of said hopper; and said stiffener member having one surface thereof disposed generally flatwise against said angled front wall when said hopper is closed to seal said hopper from the granular material.

3. In a tailgate spreader as set forth in claim 1: said end walls having portions extending upwardly above said hopper; said first gate extending transversely the full length of said hopper and substantially the full distance between said end wall portions; vertical flange means projecting transversely inwardly from said wall portions whereby when said first gate is pivoted to said upright position, lateral edge portions of said first gate seat against said flange means; and retainer means releasably retaining said first gate in said upright position.

4. In a tailgate spreader as set forth in claim 3: said flange means comprising angle members having one web thereof overlapping and secured to said wall portions and the other web thereof projecting inwardly from rear vertical edges of said wall portions; and said retainer means comprising removable pins projecting transversely inwardly from said wall portions in front of said lateral edge portions of said first gate.

5. In a tailgate spreader as set forth in claim 1: said bottom wall of said hopper having a downturned, vertical flange along its rearmost edge; a rearwardly open channel member secured along the lower edge of said second gate which abuts flatwise against said vertical flange when said second gate is in said depending position; means defining aligned, inverted U-shaped slots in said vertical flange and said channel member; a threaded stud pivotally mounted in front of said vertical flange beneath said bottom wall whereby said stud pivots upwardly and rearwardly into said aligned slots; a locking bar having a diametric aperture therein telescoped over and slidable on said stud; and a threaded tightening member carried at the outer end portion of said stud whereby said locking bar is pivotal upwardly into alignment with said channel member and is seated in said channel member by turning said tightening member to lock said second gate in said depending position.

6. In a tailgate spreader for mounting on the discharge end of a load box of a truck for spreading granular material, a hopper having front, bottom, and end walls; means defining an opening in the bottom of said hopper; material dispersing means disposed beneath said opening; a discharge plate having a discharge orifice therein of smaller size than said opening; said discharge plate being slidably mounted across said opening whereby the position of said orifice is variable with respect to said material dispersing means to vary the spread pattern; a hinge bar mounted between said end walls at the rear edge of said hopper; said bar pivotally carrying a first gate pivotal between an upright position for guiding material into the hopper and a lowered position for covering the top of the hopper whereby material can pass over said hopper; said bar pivotally carrying a second gate pivotal between a depending position closing the rear of said hopper and a rearwardly outwardly projecting position affording access to the interior of said hopper.

7. In a tailgate spreader as set forth in claim 6: said discharge plate having power means connected thereto; and a remote control means mounted in the cab of the truck whereby the operator of the truck can vary the spread pattern during spreading of the granular material.

8. In a tailgate spreader as set forth in claim 7: said power means comprising a cylinder and piston motor; said control means comprising valve means accessible to said operator.

9. A tailgate spreader adapted to be mounted on the discharge end of a load carrying compartment of a truck for receiving granular material from the compartment and spreading said material on a roadway, said spreader comprising a hopper having front, bottom, and end walls and adapted to be positioned with the upper edge of said front wall disposed adjacent to the level of the bottom of the compartment; means defining an opening in the bottom of said hopper; conveyor means disposed in said hopper for conveying the material along the hopper to said opening; material dispersing means disposed beneath said opening; a hinge bar mounted between said end walls and spaced rearwardly from said upper edge of said front wall at substantially the level of said upper edge; a dump gate pivotally mounted to said bar and pivotal from an upright position downwardly over said hopper to close said hopper whereby material from the compartment is discharged over said hopper; said dump gate adapted when in said upright position to retain the material against flowing over said hopper and guiding the material into said hopper; means for releasably retaining said dump gate in said upright position; a cleanout gate pivotally mounted at the upper edge thereof to said bar and normally directed downwardly whereby said cleanout gate axis; said the rear wall of said hopper; means releasably retaining said cleanout gate in said downward position; said cleanout gate being pivotal upwardly and outwardly of said hopper to afford access to said conveyor means and the interior of said hopper.

10. A tailgate spreader as set forth in claim 9: a discharge plate slidably mounted on the outer surface of the bottom of said hopper; said discharge plate extending beyond said opening in all slidably adjusted positions thereof; means defining an orifice in said discharge plate which is smaller than said opening and always substantially aligned with a portion of said opening; a cylinder and piston motor mounted to said hopper for moving said discharge plate with respect to said opening whereby to vary the position of said orifice with respect to said dispersing means to vary the pattern of spread of the granular material; power means for said motor; and control means for actuating said motor located in the cab of the truck.

11. In combination with a dump truck having a dump box tiltable rearwardly of the truck about a transverse axis; said dump box having a floor; a tailgate spreader for spreading granular material on roadways mounted adjacent the rear end of said dump box; said tailgate spreader comprising an elongated hopper disposed across the rear end of said dump box; said hopper having the upper, open side thereof disposed no higher than said floor whereby material is gravity fed from the dump box into said hopper upon tilting of said dump box; means defining an opening in the bottom of said hopper; conveyor means in said hopper for conveying granular material to said opening; material dispersing means disposed below said opening; a hinge bar positioned transversely of said dump box at the rear edge of said hopper substantially at the level of said floor; a dump gate pivotally mounted to said bar and pivotal between an upright position for guiding material into said hopper and a lower position covering the top of said hopper whereby material can be dumped from said dump box over the top of the said hopper; means for releasably retaining said dump gate in said upright position; a cleanout gate pivotally mounted to said bar and pivotal between a downward position whereby said cleanout gate comprises the rear wall of said hopper and a rearwardly and upwardly open position for providing access to said conveyor means and the interior of said hopper; a discharge plate covering said opening in the bottom of said hopper; said discharge plate mounted for sliding movement along said hopper transversely of said dump box; said discharge plate having an orifice therein smaller than said opening in the bottom of said hopper; power means for moving said discharge plate in either transverse direction including a control means mounted adjacent to the operator of said truck whereby the operator can shift the orifice in the discharge plate with respect to the opening in said hopper to cause the granular material to fall on said dispersing means at different places to vary the spread pattern of the material.

12. In the combination as set forth in claim 11: said dispersing means comprising a rotary spinner on a vertical axis having upwardly directed blades; means mounting said spinner for pivotal movement only about a transverse axis and retaining said spinner against transverse movement; leveling means connected between said truck and said spinner to maintain said spinner substantially level throughout tilting of said dump box; and said orifice positioned to deposit the granular material radially outwardly of the axis of said spinner at different positions transverse with respect to said truck.

13. In combination with a dump truck having a dump box tiltable rearwardly of the truck about a transverse axis: said dump box having a floor; a tailgate spreader for spreading granular material on a roadway mounted adjacent to the rear end of said dump box; said tailgate spreader comprising an elongated hopper disposed across the rear end of said dump box; said hopper having the upper, open side thereof disposed no higher than said floor whereby material is gravity fed from the dump box into said hopper upon tilting of said dump box; means defining an opening in the bottom of said hopper; conveyor means in said hopper for conveying granular material to said opening; material dispersing means disposed below said opening; a discharge plate covering said opening and mounted for sliding movement along said hopper transversely of said dump box; said discharge plate having an orifice therein smaller than said opening in the bottom of said hopper; power means for moving said discharge plate in either transverse direction including a control means mounted adjacent to the operator of said truck whereby the operator can shift the orifice in the discharge plate with respect to the opening in the hopper to cause the granular material to fall on said dispersing means at different places to vary the spread pattern of the material.

UNITED STATES PATENT OFFICE
CERTIFICATE OF CORRECTION

Patent No. 3,586,209            Dated June 22, 1971

Inventor(s)    John A. Keller

It is certified that error appears in the above-identified patent and that said Letters Patent are hereby corrected as shown below:

Claim 9, line 31, delete "axis; said"; same claim, same line, after the word "gate" insert ---constitutes---.

Signed and sealed this 23rd day of November 1971.

(SEAL)
Attest:

EDWARD M. FLETCHER, JR.                ROBERT GOTTSCHALK
Attesting Officer                      Acting Commissioner of Patents